United States Patent
Chen et al.

(10) Patent No.: US 7,684,643 B2
(45) Date of Patent: Mar. 23, 2010

(54) MUTUAL INFORMATION REGULARIZED BAYESIAN FRAMEWORK FOR MULTIPLE IMAGE RESTORATION

(75) Inventors: Yunqiang Chen, Plainsboro, NJ (US); Hongcheng Wang, Urbana, IL (US); Tong Fang, Morganville, NJ (US); Jason Jenn-Kwei Tyan, Princeton, NJ (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 683 days.

(21) Appl. No.: 11/252,334

(22) Filed: Oct. 17, 2005

(65) Prior Publication Data
US 2006/0087703 A1    Apr. 27, 2006

Related U.S. Application Data

(60) Provisional application No. 60/622,069, filed on Oct. 26, 2004.

(51) Int. Cl.
| | |
|---|---|
| H04N 1/38 | (2006.01) |
| G06K 9/40 | (2006.01) |
| G06K 9/62 | (2006.01) |
| H03M 7/00 | (2006.01) |
| G06F 19/00 | (2006.01) |

(52) U.S. Cl. .................. 382/275; 382/260; 382/264; 382/160; 358/463; 341/107; 700/93

(58) Field of Classification Search ............ 382/275
See application file for complete search history.

(56) References Cited

U.S. PATENT DOCUMENTS

| | | | | |
|---|---|---|---|---|
| 4,918,633 | A * | 4/1990 | Sullivan | 382/275 |
| 5,617,488 | A * | 4/1997 | Hong et al. | 382/229 |
| 5,832,136 | A * | 11/1998 | Hirose | 382/275 |
| 6,158,345 | A * | 12/2000 | Gelbart | 101/485 |
| 6,215,914 | B1 * | 4/2001 | Nakamura et al. | 382/284 |
| 6,389,153 | B1 * | 5/2002 | Imai et al. | 382/106 |
| 6,404,920 | B1 * | 6/2002 | Hsu | 382/190 |
| 6,864,897 | B2 * | 3/2005 | Brand | 345/582 |
| 7,120,276 | B1 * | 10/2006 | Brady et al. | 382/107 |
| 7,130,484 | B2 * | 10/2006 | August | 382/266 |

(Continued)

OTHER PUBLICATIONS

Oklem et al. "A Wavelet Transform Method for Coding Film Grain Noise Corrupted Images", Signal Processing Laboratory, Tampere University of Technology, IEEE 2000, p. 2063-2066.*

(Continued)

*Primary Examiner*—Vikkram Bali
*Assistant Examiner*—Michelle Entezari
(74) *Attorney, Agent, or Firm*—Donald B. Paschburg; F. Chau & Associates, LLC

(57) ABSTRACT

A method for multiple image restoration includes receiving a plurality of images corrupted by noise, and initializing a reduced noise estimate of the plurality of images. The method further includes estimating a probability of distributions of noise around each pixel and the probability of the signal, estimating mutual information between noise on the plurality of images based on the probabilities of distributions of noise around each pixel and the joint distribution of noise, and updating each pixel within a search range to determine a restored image by reducing the mutual information between the noise on the plurality of images.

18 Claims, 5 Drawing Sheets

U.S. PATENT DOCUMENTS

| | | | |
|---|---|---|---|
| 7,233,269 B1* | 6/2007 | Chen et al. | 341/107 |
| 7,272,265 B2* | 9/2007 | Kouri et al. | 382/260 |
| 7,424,409 B2* | 9/2008 | Ben-Gal et al. | 703/2 |
| 7,428,331 B2* | 9/2008 | Bhattacharjya | 382/165 |
| 7,499,572 B2* | 3/2009 | Fine et al. | 382/106 |
| 7,508,982 B2* | 3/2009 | Tsuyuki et al. | 382/167 |
| 7,529,392 B2* | 5/2009 | Makram-Ebeid | 382/128 |
| 7,587,099 B2* | 9/2009 | Szeliski et al. | 382/275 |
| 2003/0185450 A1* | 10/2003 | Garakani et al. | 382/232 |
| 2005/0010106 A1* | 1/2005 | Lang et al. | 600/425 |
| 2005/0058351 A1* | 3/2005 | Fine et al. | 382/228 |
| 2005/0078881 A1* | 4/2005 | Xu et al. | 382/294 |
| 2005/0254708 A1* | 11/2005 | Jolly et al. | 382/173 |
| 2005/0286767 A1* | 12/2005 | Hager et al. | 382/190 |
| 2006/0056727 A1* | 3/2006 | Jones et al. | 382/276 |
| 2007/0177695 A1* | 8/2007 | Salem et al. | 375/340 |

OTHER PUBLICATIONS

E. Bart, S. Ullman, "Image normalization by mutual information", in Proc. BMVC, pp. 327-336, 2004.*

Ildiko Suveg, George Vosselman: Mutual Information Based Evaluation of 3D Building Models. ICPR (3) 2002: 557-560.*

* cited by examiner

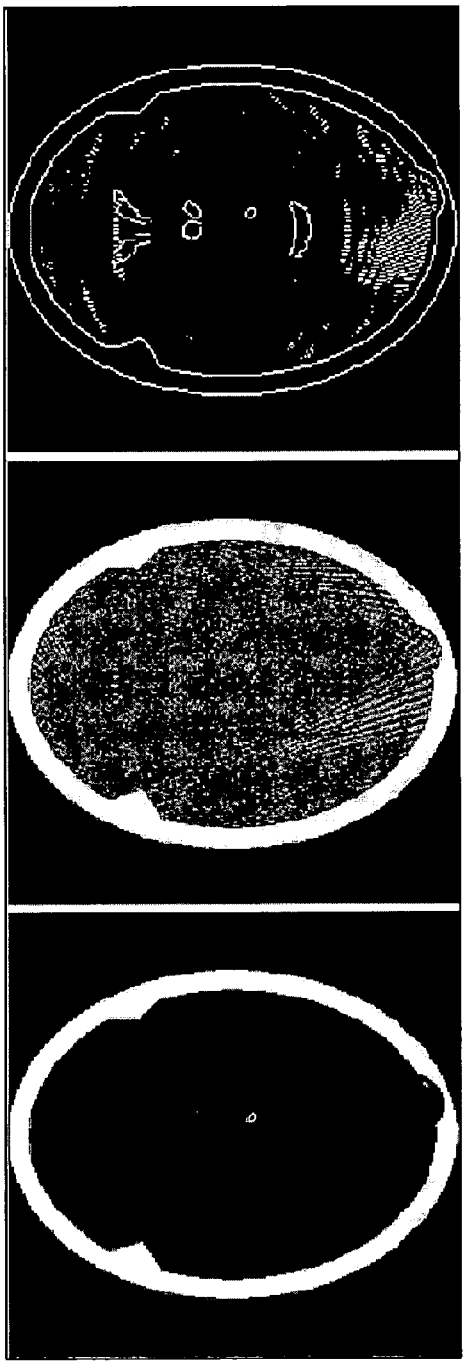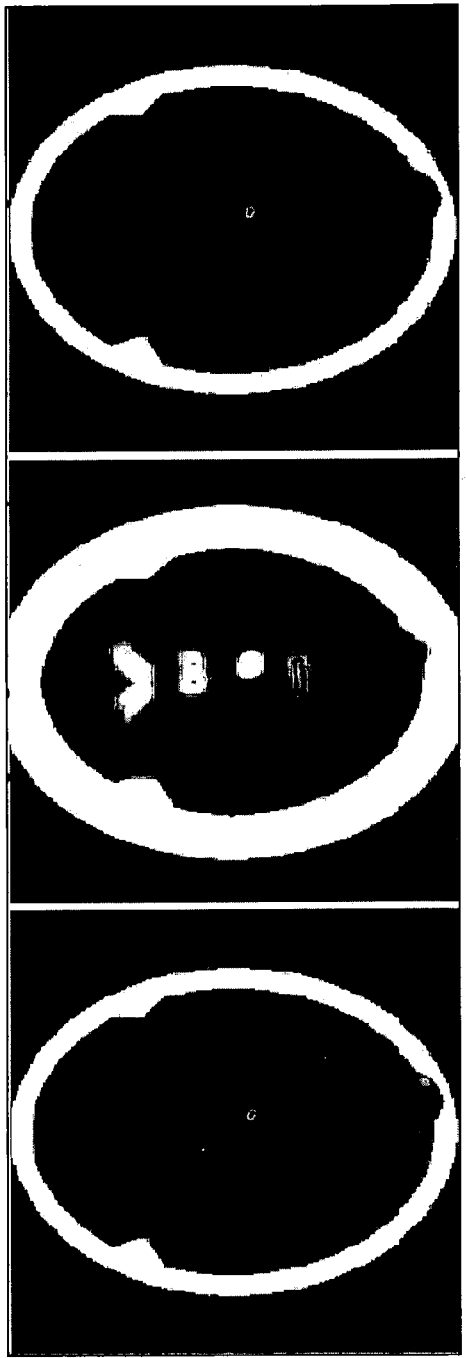

MUTUAL INFORMATION REGULARIZED BAYESIAN FRAMEWORK FOR MULTIPLE IMAGE RESTORATION

This application claims priority to U.S. Provisional Application Ser. No. 60/622,069, filed on Oct. 26, 2004, which is herein incorporated by reference in its entirety.

BACKGROUND OF THE INVENTION

1. Technical Field:

The present invention relates to image restoration, and more particularly to a regularized Bayesian framework for image restoration.

2. Discussion of Related Art:

Bayesian frameworks have been used in different applications including image processing (e.g., image restoration, stereo/motion estimation or segmentation), machine learning (e.g., hidden Markov model or graphical models), etc. In the context of multiple image restoration, conventional Bayesian methods are sensitive to model errors and cannot guarantee valid results satisfying the underlying prior knowledge, e.g., independent noise property.

In image restoration numerous methods (e.g. Wiener filter, steerable filters, Wavelet) have been proposed to improve image quality and reduce imaging noise. Bayesian restoration schemes have been explored to find the maximum a posteriori (MAP) estimation of a true signal based on statistical noise/signal models (i.e., generative models). Desirable results have been achieved when accurate models can be trained in advance. MAP can be formulated as:

$$\hat{S} = \arg\max_S P(S \mid I) = \arg\max_S P(I \mid S) P(S) \quad (1)$$

where I is an observed noisy image and S is the true image to be recovered. P(S) models the expected structures in the true image (e.g., smooth surfaces, step edges or corners). P(I|S) is the conditional distribution of the observed image I given the true image S. MAP models how the observed image is generated, and can include point spread functions and noise models. The MAP estimation is obtained by finding $\hat{S}$ that has the maximum probability: $P(\hat{S}|I)$.

Multiple images can be obtained in some cases to further improve imaging quality (e.g., ultrasound spatial/frequency compounding or multi-spectral remote sensing). A Bayesian framework can be extended to multiple images when the images are corrupted by independent noise.

Methods for improving the signal noise models attempt to discriminate the signal and noise (e.g., MRF based edge modeling, Wavelet or AQua model). Optimization procedures have also been proposed. For multi-image restoration, the correlations between the signal in different images are exploited. For example, a coupled edge modeling on multi-image has been proposed to achieve better edge detection and better edge preservation during noise reduction. In real world applications, it can be difficult to obtain accurate prior models. For example, the ultrasound speckle noise is non-stationary and changes according to ultrasound attenuation and the sub-resolution scatterers in the tissue. Various types of structures (e.g., corners, edges or surfaces) are also hard to model accurately.

Further, over-simplified assumptions (e.g., the noise being independent of the signal) may need to be made to allow tractable solutions. Under these difficult conditions, the conventional Bayesian framework cannot provide robust results and some of the underlying prior knowledge/constraints may even be violated. One important prior in multi-image restoration is that the multiple images are often corrupted by independent noise, which is the very basis for many Bayesian restoration methods to factorize the joint probabilities and hence allows tractable solutions. However, this prior is also under-utilized and often violated one when there are modeling errors. An inaccurate weighting between noise and signal models results in significantly correlated noise. Such is violations of the prior constraints indicate restoration errors and sensitivity to inaccurate models of the conventional Bayesian framework. In machine learning, Support Vector Machine (SVM) has been proposed to replace the generative model based Bayesian methods for better generalization. In image restoration, however, generative models of signal and noise have been extensively studied and are important for discriminating noise and signal. It is important not to forfeit those generative models.

Therefore, a need exists for a Bayesian system and method having improved generalization and enforced validity.

SUMMARY OF THE INVENTION

According to an embodiment of the present disclosure, a computer-implemented method for multiple image restoration includes receiving a plurality of images corrupted by noise, and initializing a reduced noise estimate of the plurality of images. The method further includes estimating a probability of distributions of noise around each pixel and the probability of the signal, estimating mutual information between noise on the plurality of images based on the probabilities of distributions of noise around each pixel and the joint distribution of noise, and updating each pixel within a search range to determine a restored image by reducing the mutual information between the noise on the plurality of images.

Initializing the reduced noise estimate of the plurality of images comprises applying a low-pass filter to the average of the plurality of images.

Estimating the distributions of noise and the joint distribution, estimating the mutual information and updating each pixel are performed iteratively. Iterations are performed until a convergence is determined.

The mutual information is included to determine independence between noise, wherein noise is independent among the plurality of images.

Estimating the mutual information terms comprises determining a convolution of a probability of an updated pixel and a Gaussian density around the updated pixel.

According to an embodiment of the present disclosure, a computer-implemented method for multiple image restoration includes receiving a plurality of images including noise, and initializing a reduced noise estimate of the plurality of images. The method further includes estimating a probability of distributions of noise around each pixel and the signal, determining a measure of dependency among the noise on the plurality of images based on the probabilities of distributions of noise around each pixel and the joint distribution of the noise on the plurality of images, and updating each pixel within a search range to determine a restored image using the measure of dependency.

Initializing the reduced noise estimate of the plurality of images comprises applying a low-pass filter to the average of the plurality of images.

Estimating the distributions of noise and the joint distribution, determining the measure of dependency and updating each pixel are performed iteratively. Iterations are performed until a convergence is determined.

The measure of dependency is one of an estimation of mutual information among the plurality of images, correlation among the plurality of images and joint movements among the plurality of images.

Estimating the mutual information terms comprises determining a convolution of a probability of an updated pixel and a Gaussian density around the updated pixel.

According to an embodiment of the present disclosure, a program storage device is provided readable by machine, tangibly embodying a program of instructions executable by the machine to perform method steps for multiple image restoration. The method includes receiving a plurality of images, wherein the plurality of images include a common signal corrupted by independent noise, initializing a reduced noise estimate of the plurality of images, and estimating a probability of a distribution of noise around each pixel and a probability of the common signal. The method further includes estimating mutual information between noise on the plurality of images based on the probabilities of the distribution of noise around each pixel, the probability of the common signal and a joint distribution of the noise on the plurality of images, and updating each pixel within a search range to determine a restored image by reducing the mutual information between the noise on the plurality of images.

BRIEF DESCRIPTION OF THE DRAWINGS

Preferred embodiments of the present invention will be described below in more detail, with reference to the accompanying drawings:

FIG. 4A is an illustration of the Herman head phantom;

FIG. 4B is an illustration an average image as between to input images;

FIG. 4C is an illustration of a 7×7 sobel edge detection based on the image of FIG. 4B;

FIG. 4D is an illustration of a MAP result based on the image of FIG. 4B;

FIG. 4E is an illustration of a mutual information term based on the image of FIG. 4B according to an embodiment of the present disclosure; and FIG. 4F is an illustration of restored image determined using a regularized Bayesian method based on the image of FIG. 4B according to an embodiment of the present disclosure.

DETAILED DESCRIPTION OF PREFERRED EMBODIMENTS

According to an embodiment of the present disclosure, generalization and validity are emphasized in the regularized Bayesian method. The regularized Bayesian framework explicitly enforces the validity of a result to improve generalization capability. For multiple image restoration, it uses mutual information (MI) to explicitly verify the validity of the restoration results based on the independence (independent noise prior). Efficient approximations based on a Taylor expansion are used to adapt MI into standard energy forms to determine the regularized Bayesian method.

According to an embodiment of the present disclosure, a regularized Bayesian framework effectively utilizes a generative signal/noise model and is robust to various model errors, as demonstrated in experiments on imaging applications.

It is to be understood that the present invention may be implemented in various forms of hardware, software, firmware, special purpose processors, or a combination thereof. In one embodiment, a regularized Bayesian method for image restoration may be implemented in software as an application program tangibly embodied on a program storage device. The application program may be uploaded to, and executed by, a machine comprising any suitable architecture.

Figure 1:
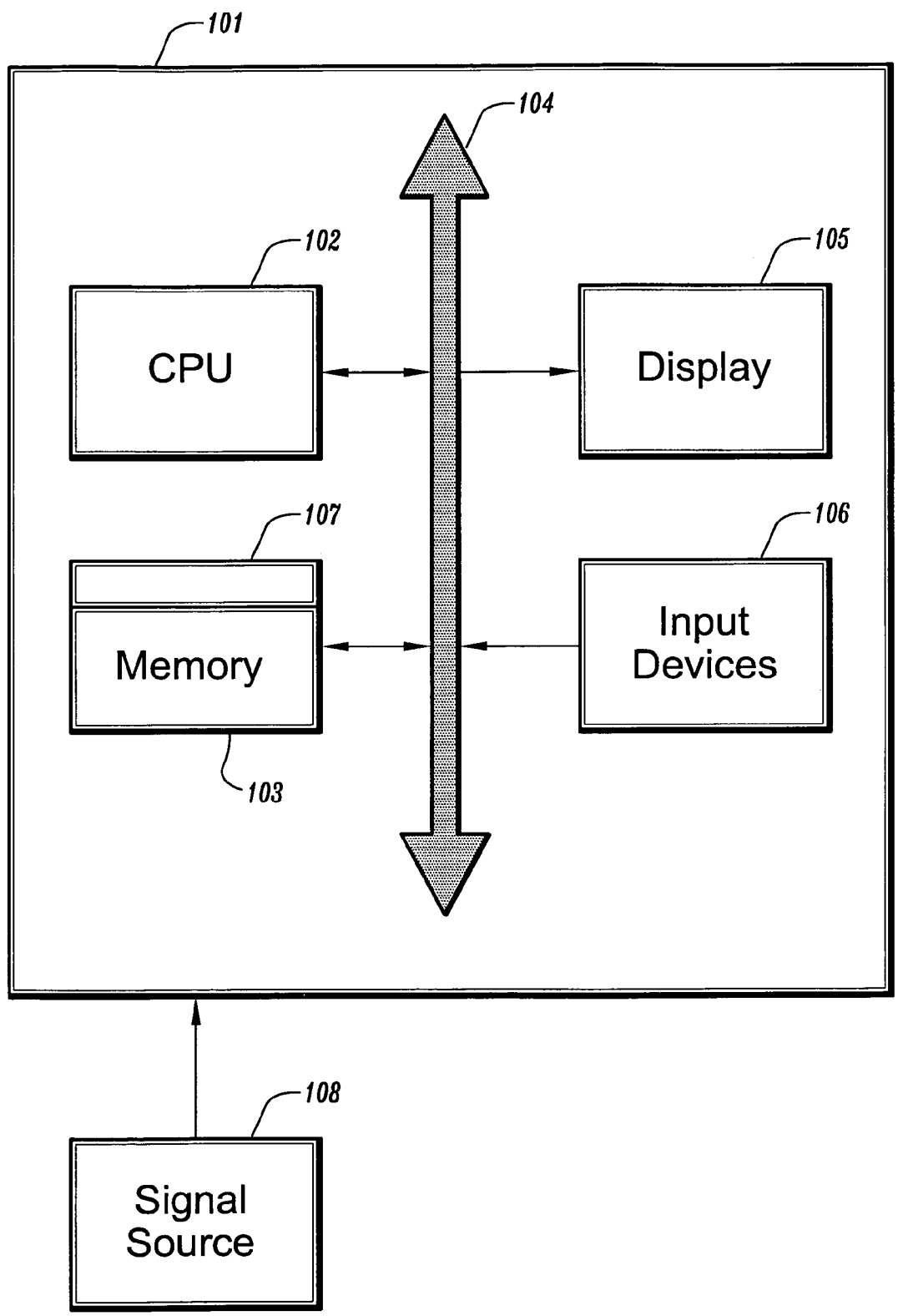
FIG. 1 is a diagram of a system according to an embodiment of the present disclosure.

Referring to FIG. 1, according to an embodiment of the present disclosure, a computer system 101 for implementing a regularized Bayesian method for image restoration can comprise, inter alia, a central processing unit (CPU) 102, a memory 103 and an input/output (I/O) interface 104. The computer system 101 is generally coupled through the I/O interface 104 to a display 105 and various input devices 106 such as a mouse and keyboard. The support circuits can include circuits such as cache, power supplies, clock circuits, and a communications bus. The memory 103 can include random access memory (RAM), read only memory (ROM), disk drive, tape drive, etc., or a combination thereof. The present invention can be implemented as a routine 107 that is stored in memory 103 and executed by the CPU 102 to process the signal from the signal source 108. As such, the computer system 101 is a general-purpose computer system that becomes a specific purpose computer system when executing the routine 107 of the present invention.

The computer platform 101 also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present disclosure.

According to an embodiment of the present disclosure, a system and method implements mutual information in a MAP framework as an energy term to regularize image restoration.

To achieve improved generalization, the validity of the restoration results are analyzed against prior knowledge, including generative models P(S) and P($I_i$|S), and the priors behind the generative models, e.g., independent noise constraint.

Approximations are used to adapt the mutual information into a standard energy term for effective optimization. In the regularized Bayesian framework, both the generative signal/noise models and the independent noise constraint are exploited. The mutual information term assures the validity of the restoration results and robustness to inaccurate models while the generative models stabilize the process of minimizing mutual information. The experiments and comparisons in imaging applications demonstrate the robustness of the regularized Bayesian framework, even when accurate models are not readily available.

Mutual information regularized multiple image restoration: Multiple images or multi-channel images can greatly improve imaging quality. For example, some ultrasound B-scans can generate multiple images of the same tissue using ultrasound of different frequencies, which is also called compounding. The multiple images have the same underlying signal but independent speckle noise. Unlike the multi-image based super-resolution techniques, these multiple images do not provide extra information for super-resolution but can help reduce the imaging noise. Because a goal is to reduce noise instead of correcting imaging defects (e.g., out of focus or motion blur), the point spread function can be ignored and the following image formation model can be used:

$$I_i = S + N_i, \ i \in [1, M] \quad (2)$$

where S is the underlying structure (i.e. the true image) and $I_i$ is one of the M observed images, corrupted by additive noise $N_i$. $N_i$ and $N_j$ are independent when $i \neq j$. This image formation model assumes that all images are aligned and have the same signal in them. It is suitable for many applications and allows for focusing on a Bayesian framework and its underlying problems. For more difficult imaging processes (e.g., multi-spectral images or for images from different medical devices), different image formation models can be used.

A conventional Bayesian framework is extended to two images based on Eq. (2). With the knowledge that S, $N_1$ and $N_2$ are independent:

$$P(S \mid I_1, I_2) = c \cdot P(I_1, I_2 \mid S) P(S) \quad (3)$$
$$= c \cdot P_{N_1}(I_1 - S) P_{N_2}(I_2 - S) P_S(S)$$

where c is a normalization constant. $P_s(\ )$ and $P_{N_i}(\ )$ are the prior signal/noise models respectively. Edge modeling can be implemented for the signal. Based on Gaussian noise model and smooth signal constraint, the cost function $C(\hat{S})$ of the MAP estimation can be written as:

$$\hat{S} = arg\min_{\hat{S}} C(\hat{S}) = arg\min_{\hat{S}}(-\log(P(\hat{S} \mid I_1, I_2))) \quad (4)$$
$$= arg\min_{\hat{S}}(\lambda_1(I_1 - \hat{S})^2 + \lambda_2(I_2 - \hat{S})^2 + \lambda_3(\hat{S} - \bar{S})^2)$$

where $\bar{S}$ is the average intensity of the true signal in a small neighborhood and $\lambda_i$ is the weighting of each constraint. The first and second terms enforce that the estimated image should look like the observed images. The third term models the signal properties and prefers smooth signal. More complex models can be used to represent the signal properties. The MAP estimation can be obtained when the derivative of $C(\hat{S})$ is equal to zero:

$$\frac{\partial C(\hat{S})}{2 \cdot \partial \hat{S}} = \lambda_1(\hat{S} - I_1) + \lambda_2(\hat{S} - I_2) + \lambda_3(\hat{S} - \bar{S}) = 0 \quad (5)$$

Because the $\bar{S}$ is unknown, $C(\hat{S})$ can be optimized in an iterative manner. At each iteration, $\bar{S}$ is estimated based on the solution of previous iteration $\hat{S}^{(k)}$. The iterative minimization process is as follows:

$$\hat{S}^{(k+1)} = \frac{(\lambda_1 + \lambda_2) I_{avg} + \lambda_3 \hat{S}^{(k)}}{\lambda_1 + \lambda_2 + \lambda_3} \text{ where} \quad (6)$$
$$I_{avg} = (\lambda_1 I_1 + \lambda_2 I_2) / (\lambda_1 + \lambda_2).$$

Generalization and independence analysis: In the image formation model in Eq. (2), the same underlying image is corrupted by independent noise, which allows for $P(I_1, I_2 \mid S)$ to be factorized for simpler noise modeling and optimization procedures. However, the independence constraint can be under-utilized and violated when there are model errors.

For independent analysis, in the context of multiple image restoration, when an estimation of the 'true' signal $\hat{S}$ is obtained, the estimation of the noise components $\hat{N}_i = I_i - \hat{S}$ is also available, which should be independent of the noise on other images. When there are restoration errors (i.e. $S - \hat{S}$), it appears uniformly in the estimated noise $\hat{N}_i$ on all images:

$$\hat{N}_i = I_i - \hat{S} = N_i + (S - \hat{S}) \quad (7)$$

The generalization and validity are related. Inaccurate models cause restoration errors (i.e. $(S - \hat{S})$), which is common for all the estimated noise. It will increase the dependencies between the estimated noise and hence violate the independent noise constraint. Violations of the prior constraints, on the other hand, indicate restoration errors. By regularizing the restoration process explicitly with the prior constraint, the results and the generalization performance of the conventional Bayesian framework can be improved. Independence analysis can be used for this purpose. Mutual information is a way to measure the independence:

$$MI(\hat{N}_1, \hat{N}_2) = \sum_{\hat{N}_1} \sum_{\hat{N}_2} p(\hat{N}_1, \hat{N}_2) \log \frac{p(\hat{N}_1, \hat{N}_2)}{p(\hat{N}_1) p(\hat{N}_2)} \quad (8)$$

It is worth noting that correlation $\rho(\hat{N}_1, \hat{N}_2)$ is a simpler way to detect the dependencies and is easier to evaluate than mutual information. But it is not suitable here because the estimation $\hat{S}$ is typically dependent on $N_i$ and hence $\rho(\hat{N}_1, \hat{N}_2)$ is not proportional to $\|S - \hat{S}\|^2$. A simple example is that, for each pixel p, $\hat{S}_p$ randomly takes the value of either $I_1$ or $I_2$, which will guarantee $\rho(\hat{N}_1, \hat{N}_2) = 0$. But $\hat{N}_1$ and $\hat{N}_2$ are not independent in this case. Other methods for measuring dependencies may be implemented, e.g., correlation or higher order joint moments.

MI regularized Bayesian restoration: To explicitly enforce the independent noise constraint, mutual information is incorporated into the conventional Bayesian framework as a regularization term. The regularized Bayesian restoration can be described as:

$$\hat{S} = arg\min_{\hat{S}} C(\hat{S}) = \quad (9)$$
$$arg\min_{\hat{S}} (\lambda_0(\hat{S} - \bar{S})^2 + \lambda_1(I_1 - \hat{S})^2 + \lambda_2(I_2 - \hat{S})^2 + \lambda_3 MI(\hat{N}_1, \hat{N}_2))$$

where the first term $(\lambda_0(\hat{S}-\bar{S})^2)$ is a signal model, the second and third terms $(\lambda_1(I_1-\hat{S})^2$ and $\lambda_2(I_2-\hat{S})^2)$ are noise models and the forth term $(\lambda_3 MI(\hat{N}_1,\hat{N}_2))$ is an independence constraint.

If the Bayesian estimation has accurate models and provides a desirable restoration result, residual errors (e.g., $N_i$+$(S-\hat{S})$) on different images satisfy the independence constraint and the mutual information term is at its minimal value 0 as well. But if the Bayesian estimation is wrong due to either inaccurate models or converging to a local minimum, the regularization term will penalize the solution and make it less likely to happen.

Mutual information can be expensive to evaluate and makes the objective function extremely difficult to optimize.

When more than two images are considered, the noise components on different images are mutually independent. To enforce this constraint, noise components are modeled by pairwise mutual information:

$$MI(\hat{N}_1, \hat{N}_2, \ldots \hat{N}_M) = \sum_{i=1}^{M-1} \sum_{j=i+1}^{M} MI(\hat{N}_i, \hat{N}_j) \quad (10)$$

Based on Eq. (10), the two-image based restoration scheme can be extended to handle more images as follows:

$$\hat{S} = \arg\min_{\hat{S}} C(\hat{S}) = \quad (11)$$

$$\arg\min_{\hat{S}} \sum_{i=1}^{M} \lambda_i (I_i - \hat{S})^2 + \lambda \sum_{i=1}^{M-1} \sum_{j=i+1}^{M} MI(\hat{N}_i, \hat{N}_j) + \lambda_0 (\hat{S} - \bar{S})^2$$

Optimization and Implementation: To find an optimal solution of the mutual information regularized objective function in Eq. (9) (e.g., given prior models (for example, see block 204 in FIG. 2) a restoration S which gives a lowest value of Eq. (9)), an iterative method can be used. The difficulty lies in the mutual information term, which is computationally prohibitive to optimize. Approximations of the mutual information term based on Taylor expansion are derived herein for efficient optimization. The approximations can be combined with other types of optimization procedures, e.g., the Graph Cut method.

For the standard iterative optimization procedure, an average of the multiple images is obtained, followed by a low-pass filtering. The low-pass filtered average image is used as an initial estimation (i.e., $\hat{S}^{(0)}$) (e.g., block 202 in FIG. 2). At iteration k+1, the estimated signal is updated for each pixel p (i.e., $\hat{S}_p^{(k+1)}$) based on the result of previous iteration (i.e., $\hat{S}^{(k)}$) so that the objective function in Eq. (9) is minimized. This process continues until convergence (e.g., block 206 in FIG. 2). The value of convergence may be predetermined or set by a user.

A challenge in the optimization is the complexity of determining $MI(\hat{N}_1,\hat{N}_2)$, where $\hat{N}_1=(I_1-\hat{S}^{(k+1)})$ and $\hat{N}_2=(I_2-\hat{S}^{(k+1)})$. The MI term can be expressed by the entropy $H(\hat{N}_1)$, and the joint entropy $H(\hat{N}_2)$:

$$MI(\hat{N}_1, \hat{N}_2) = H(\hat{N}_1) + H(\hat{N}_2) - H(\hat{N}_1, \hat{N}_2) = -\sum_z P_1(z) \log P_1(z) - \quad (12)$$

-continued
$$\sum_z P_2(z) \log P_2(z) + \sum_{z_1, z_2} P_{1,2}(z_1, z_2) \log P_{1,2}(z_1, z_2)$$

where $P_1(z)$, $P_2(z)$ and $P_{1,2}(z_1,z_2)$ are the probability distribution of $\hat{N}_1$, $\hat{N}_2$ and their joint distribution respectively. Because $\hat{N}_1$ and $\hat{N}_2$ are typically different from the true $N_1$ and $N_2$ during the iterations, these probabilities can be estimated from samples. For non-stationary noise, the probabilities are estimated within a small neighborhood (e.g. 15×15 window in our experiments) centered at each pixel p. Parzen Window is used to approximate the probability by a superposition of Gaussian densities:

$$P_1(z) = \frac{1}{|D|} \sum_p G_\psi(z - n_{1,p}) \quad (13)$$

$$P_2(z) = \frac{1}{|D|} \sum_p G_\psi(z - n_{2,p})$$

$$P_{1,2}(z) = \frac{1}{|D|} \sum_p G_\psi[(z_1, z_2) - (n_{1,p}, n_{2,p})]$$

where, $$G_\psi(z) = \frac{1}{\sqrt{(2\pi)^2 \psi}} \exp\left(-\frac{1}{2} z^T \psi^{-1} z\right)$$

and $|D|$ is the size of the samples. $n_{1,p}$ and $n_{2,p}$ are the noise components in image $I_1$ and $I_2$ at position p respectively.

By updating the signal estimation at pixel p to $\hat{S}_p^{(k+1)}$, the residual errors become: $n_{1,p}=I_{1,p}-\hat{S}_p^{(k+1)}$ and $n_{2,p}=I_{2,p}-\hat{S}_p^{(k+1)}$. The $P_1(z)$ and $P_2(z)$ need to be re-estimated. Finding an update to minimize $MI(\hat{N}_1,\hat{N}_2)$ includes re-estimating these probabilities for each possible value of $\hat{S}_p^{(k+1)}$. For efficient optimization, the Taylor expansion can be used to approximate the mutual information. The complex mutual information is approximated with summation operations. The computational cost decreases and optimization techniques can be applied. Mutual information is estimated locally instead of using the whole image since the signal and noise distributions may vary a lot through the whole image. Since $P_1(z)$ depends on $\hat{S}_p^{(k+1)}$, the Taylor expansion, $x\log x = -x_0 + (1+\log x_0)x + 0((x-x_o)^2)$, is used to approximate $H(\hat{N}_1)$ as:

$$H(\hat{N}_1) = -\sum_z P_1(z) \log P_1(z) \quad (14)$$

$$\cong \sum_z [P_1^0(z) - (1 + \log(P_1^0(z)) \cdot P_1(z)]$$

$$= \sum_z P_1^0(z) - \sum_z P_1(z) - \sum_z \log(P_1^0(z)) \cdot P_1(z)$$

$$= -\sum_z \log(P_1^0(z)) \cdot P_1(z)$$

where $P_1^0(z)$ is the distribution of the estimated noise of previous iteration and $P_1(z)$ is the distribution after update. From Eq. (13) and (14), $H(\hat{N}_i)$ can be obtained as:

$$H(\hat{N}_i) \approx -\frac{1}{|D|} \sum_p \sum_s \log(P_i^0(z)) \cdot G_\psi(z - n_{i,p}) \quad (15)$$

$$= -\frac{1}{|D|} \sum_p f_i(n_{i,p})$$

where $f_i(z) = \log(P_i^0(z)) \otimes G_\psi(z)$ and '$\otimes$' means convolution. Similarly, the joint probability term in Eq. (12) can be approximated as follows:

$$H(\hat{N}_1, \hat{N}_2) \approx -\frac{1}{|D|} \sum_p \sum_{z_1} \sum_{z_2} \log(P_{1,2}^0(z_1, z_2)) \cdot \quad (16)$$

$$G_\psi((z_1, z_2) - (n_{1,p}, n_{2,p}))$$

$$= -\frac{1}{|D|} \sum_p f_{1,2}(n_{1,p}, n_{2,p})$$

where $f_{1,2}(z_1, z_2) = \log(P_{1,2}^0(z_1, z_2)) \otimes G_\psi(z_1, z_2)$. Based on these approximations, the cost value in Eq. (9) can be determined efficiently without re-estimating the probability density for every possible value (e.g., updated for each pixel for each possible value). For is iteration k+1, the $P_1^0(z)$, $P_2^0(z)$ and $P_{1,2}^0(z_1,z_2)$ are estimated based on $\hat{S}_{(k)}$. $P_1^0(z)$, $P_2^0(z)$ and $P_{1,2}^0(z_1,z_2)$ are convoluted with Gaussian kernels $G_\psi(z)$ and $G_\psi(z_1,z_2)$ to obtain $f_1(z)$, $f_2(z)$ and $f_{1,2}(z_1,z_2)$ (see FIG. 2, blocks 203 and 204). For any given update $\hat{S}_p^{(k+1)}$, the cost of the MI term can be determined by looking up the corresponding value in the f( ) and find the one minimizing the objective function:

$$\hat{S}_p^{(k+1)} = \arg\min_{\hat{S}} (\lambda_0(\hat{S}_p - \overline{S}_p^{(k)})^2 + \lambda_1(n_{1,p})^2 + \quad (17)$$

$$\lambda_2(n_2, p)^2 + \lambda_3(f_{1,2}(n_{1,p}, n_{2,p}) - f_1(n_{1,p}) - f_2(n_{2,p}))$$

Figure 2:
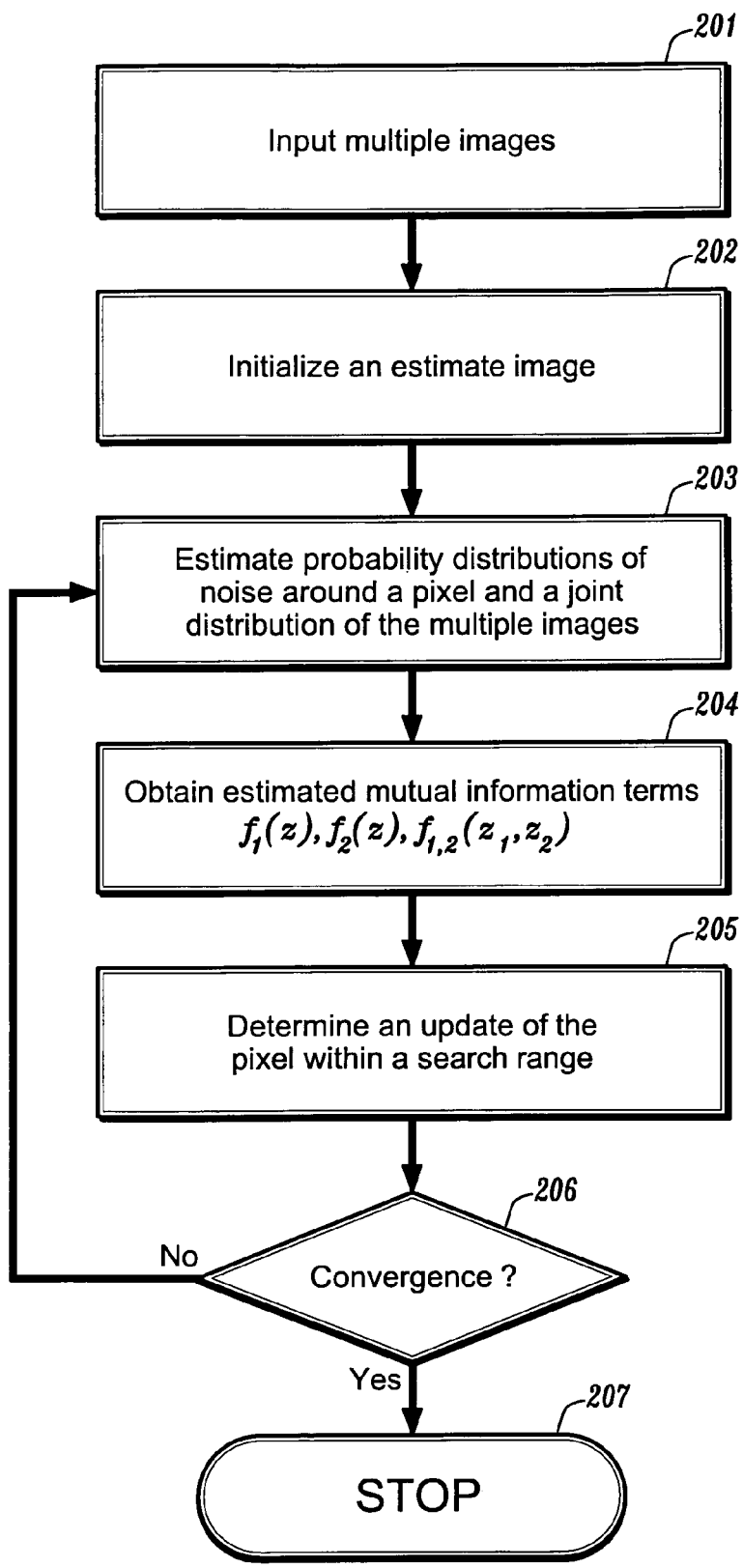
FIG. 2 is a flow chart of a method according to an embodiment of the present disclosure.

The iterative optimization algorithm for two-image S restoration can described with respect to FIG. 2.

For image restoration using two images:
Data: Given images $I_1$, $I_2$ with independent noise. (201)
Result: Restored image $\hat{S}$.

Initialize the estimated image using the low-pass filtered average image, i.e., $$\hat{S}^0 = G_\sigma \otimes \left(\frac{I_1 + I_2}{2}\right);$$

(202)
while ~stop do
  for each pixel p do
    Within a neighborhood w(p), centered around pixel p, estimate the $P_1^0(z)$, $P_2^0(z)$ and $P_{1,2}^0(z_1,z_2)$ based on $\hat{S}_p^{(k)}$ (203) and obtain the corresponding $f_1(z)$, $f_2(z)$ and $f_{1,2}(z_1,z_2)$ (204);

For a search range $-m \leq \delta \leq m$ for each pixel, each term in Eq. (17) is determined corresponding to $\hat{S}_p^k + \delta$. The optimal update is obtained as:

$$\hat{S}_p^{k+1} = \arg\min_{-m \leq \delta \leq m} C(\hat{S}_p^k + \delta). \quad (205)$$

End
If $C(\hat{S}^{k+1}) - C(\hat{S}^k) < \epsilon$, stop. (206)
Otherwise, $\hat{S}^k = \hat{S}^{k+1}$. (207)

End

To validate the efficacy and robustness of a regularized Bayesian framework, it has been applied to imaging applications, where accurate signal/noise models are difficult to obtain. The regularized objective function in Eq. (11) is used in all experiments and optimized as depicted in FIG. 2. Note that Eq. (11) uses simple noise models and smooth signal constraint with no modeling of edges or corners. When regularized by a mutual information term according to an embodiment of the present disclosure, it provides desirable, e.g., sharp, restoration results in the experiments.

For comparison, conventional Bayesian methods have been used. Without explicit edge modeling, conventional Bayesian methods significantly blur the sharp boundaries.

For reasonable results, edge modeling has been added as in:

$$\hat{S} = \arg\min_{\hat{S}} \sum_p \{\lambda_1(I_{1,p} - \hat{S}_p)^2 + \quad (18)$$

$$\lambda_2(I_{2,p} - \hat{S}_p)^2 + \lambda_3(1 - e_p)(\hat{S}_p - \overline{S}_p)^2 + \lambda_4 e_p\}$$

where $e_p$ is the edge process, which is 0 or 1. When $e_p = 1$, the smoothness constraint is disabled and hence preserves the sharp edges. To prevent all the pixels being treated as edges, there is a penalty $\lambda_4$ for $e_p = 1$. Restoration quality depends heavily on the accuracy of the edge estimation.

Figure 3A:
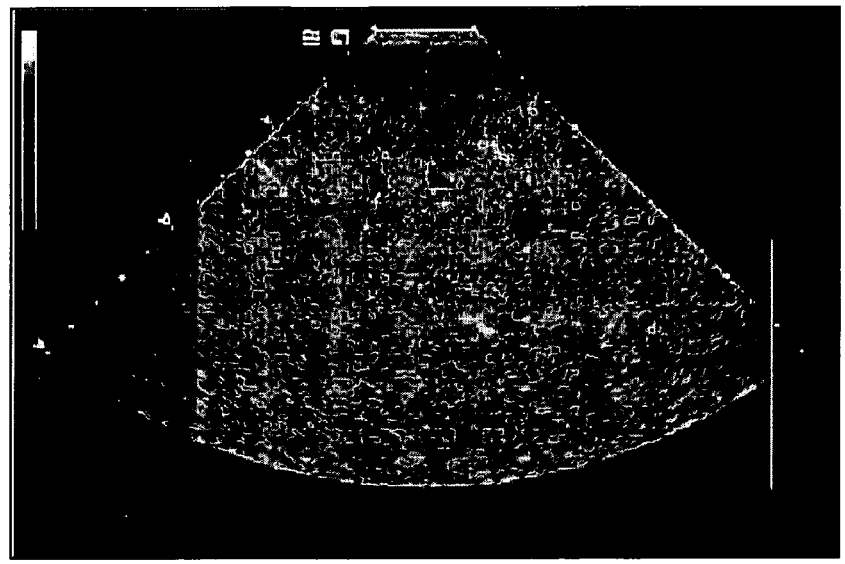
FIG. 3A is an illustration of an original B-scan.

Ultrasound frequency compounding: For a regularized Bayesian method according to an embodiment of the present disclosure, in ultrasound frequency compounding, three images are scanned using ultrasound of different frequencies. Because the signal has been taken logo before converted to display images, the multiplicative speckle noise in acoustic signal is now additive. One of the three compounding images is shown in FIG. 3A. One difficulty in ultrasound imaging is the non-stationary speckle noise due to the sub-resolution scatters, ultrasound attenuation, beam forming and the fan-shape scanning. Typically, the speckle noise has larger variance and more lateral correlation at the far end of the scanning, which makes it more difficult to be discriminated from the edges. Fortunately, the independent noise property still holds and forms the basis of ultrasound compounding techniques.

Figure 3B:
FIG. 3B is an illustration of an image restoration determined by a conventional Bayesian method.

The conventional Bayesian method is sensitive to the inaccurate noise model. FIG. 3B shows the result of the conventional Bayesian method described in Eq. (18). As we can see, strong edges can be detected and preserved-well by the edge modeling. But due to the stationary noise assumption in Eq. (18), at near end where noise is weaker than modeled, some weak edges that can be detected are missed and severely blurred. While in some other regions, the noise stronger than modeled is not reduced enough. 'Worm' patterns continue to appear, particularly at the far end.

Figure 3C:
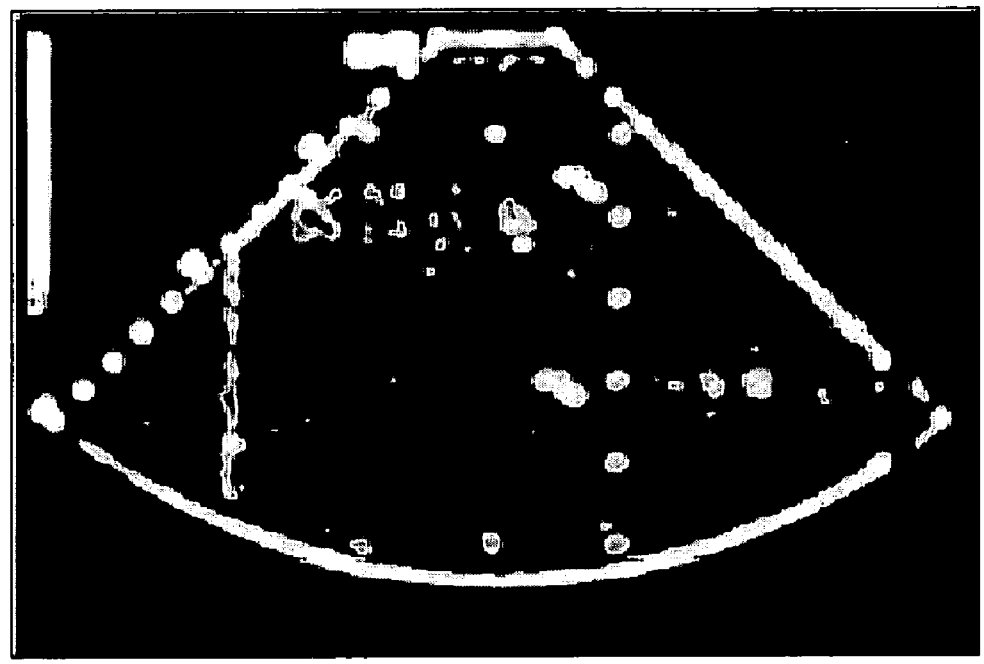
FIG. 3C is an illustration of an MI penalty term according to an embodiment of the present disclosure.
Figure 3D:
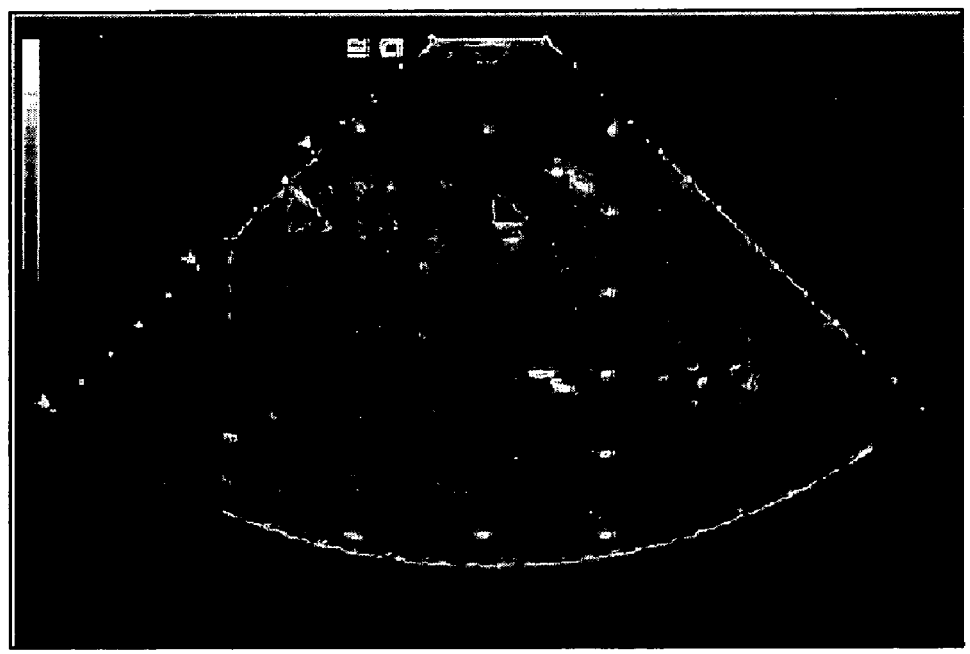
FIG. 3D is an illustration of an image restoration is by a regularized Bayesian method according to an embodiment of the present disclosure.

A regularized Bayesian method (e.g., as shown in Eq. (11) and FIG. 2) exploits no extra information than the conventional Bayesian methods and lacks explicit edge modeling. But by regularizing the result with the independence constraint, a regularized Bayesian method achieves an improved result as shown in FIG. 3D. The importance of the MI penalty term can be seen in FIG. 3C, where white means large penalty. At the first iteration, the restoration results ($\hat{S}^0$) is initialized to be the low-pass-filtered average image, which severely blurs the sharp boundaries. The MI term successfully captures those restoration errors with very few false positives in spite of the hard-to-model speckle noise. With this MI penalty term, a regularized Bayesian method successfully prevents the blurring across the edge or corners in FIG. 3D. Detecting and preservation of weak edges is improved much better, while the noise regions (especially the far end) are smoother.

CT image reconstruction: a regularized Bayesian method has been tested in an extension for Computed Tomography (CT) in particular the 'Herman head' phantom generated by CTSim software (http://www.ctsim.org/) as shown in FIG. 4A. Filtered back-projection (FBP) is widely used in most commercial CT machines for its efficiency but suffers streaking artifacts. Image restoration techniques can significantly improve the FBP's quality. Projections of the phantom were generated and corrupted with zero mean white Gaussian noise (variance is 1). Five different images were obtained by FBP (iradon function in Matlab). All the images have the same structure but the noise is independent. The back-projection produces streaking type of noise, which is difficult to be distinguished from true edges in the image.

The average of the five images is shown in FIG. 4B. The multi-image restoration technique is applied to improve the image quality. Both a conventional Bayesian method and a regularized Bayesian method significantly improve the quality. However, the conventional Bayesian method needs more specific tuning. Simple edge modeling in Eq. (18) cannot handle the strong streaking noise. To obtain a good result, the edge detector needs to be tuned manually. From original phantom image, positions of the structures are known and the sobel edge detector was implemented with different sizes and different thresholds to detect the structures in the average image. The 7×7 sobel filter with threshold 35 detected the structures reasonably well with the least false detection (FIG. 4C). The restoration result shown in FIG. 4D preserves most structures but has some significant streaking noise due to the false edge detection.

A regularized Bayesian method needs no specific tuning. Initialized with the low-pass filtered average image, the MI term successfully detects the restoration errors (i.e., the blurred structures) with no false detection as shown in FIG. 4E. The MI term is estimated within a neighborhood and hence more blurred than the sobel edge detector in FIG. 4C. But it does not affect the sharpness of the restored structures because the MI term will be reduced only when the restoration error within the neighborhood is minimized. In the final result in FIG. 4F, all the streaking noise is removed while the structures are well preserved.

For a quantitative analysis, the results from different methods are compared with the original phantom. The average sum of squared errors per pixel is shown as follows:

| METHOD | AVERAGE FBP | MAP | MI REGULARIZED |
|---|---|---|---|
| Error | 464.15 | 10.68 | 8.75 |

Even with hand tuned edge detector, the conventional Bayesian method does not handle non-stationary streaking noise as well as a regularized Bayesian framework. In the experiments, a regularized framework is robust to both inaccurate signal modeling and non-stationary noise.

A regularized Bayesian framework may be extended to more complex image formation models (e.g., the multi-channel images or multi-spectral remote sensing images).

Having described embodiments for a system and method for image restoration, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A computer-implemented method for multiple image restoration comprising:
   receiving a plurality of images, wherein each image of the plurality of images includes a common signal with remaining ones of the plurality of images, and each image of the plurality of images is corrupted by independent noise different than noise of the remaining ones of the plurality of images;
   initializing a reduced noise estimate of the plurality of images;
   estimating a probability of a distribution of noise around each pixel and a probability of the common signal;
   estimating mutual information between noise on the plurality of images based on the probabilities of the distribution of noise around each pixel, the probability of the common signal and a joint distribution of the noise on the plurality of images; and
   updating each pixel within a search range to determine a restored image by reducing the mutual information between the noise on the plurality of images,
   wherein the method is performed by a computer.

2. The computer-implemented method of claim 1, wherein initializing the reduced noise estimate of the plurality of images comprises applying a low-pass filter to an average of the plurality of images.

3. The computer-implemented method of claim 1, wherein estimating the distributions of noise and the joint distribution, estimating the mutual information and updating each pixel are performed iteratively, wherein updates of respective pixels correspond to a minimum of the mutual information within the search range.

4. The computer-implemented method of claim 3, wherein iterations are performed until a convergence is determined.

5. The computer-implemented method of claim 1, wherein the mutual information is included to determine independence between noise.

6. The computer-implemented method of claim 1, wherein estimating the mutual information terms comprises determining a convolution of a probability of an updated pixel and a Gaussian density around the updated pixel.

7. A system for multiple image restoration comprising:
a memory device storing a plurality of instructions embodying the system for multiple image restoration;
a processor for receiving a plurality of images including noise and executing the plurality of instructions to perform a method comprising:
   initializing a reduced noise estimate of the plurality of images;
   estimating a probability of distributions of noise around each pixel and a joint distribution of the plurality of images;
   determining a measure of dependency among the plurality of images based on the probabilities of distributions of noise around each pixel and the joint distribution of the plurality of images; and
   updating each pixel within a search range by minimizing the measure of dependency at the respective pixels to determine a restored image using the measure of dependency.

8. The system of claim 7, wherein initializing the reduced noise estimate of the plurality of images comprises applying a low-pass filter to an average of the plurality of images.

9. The system of claim 7, wherein estimating the distributions of noise and the joint distribution, determining the measure of dependency and updating each pixel are performed iteratively.

10. The system of claim 9, wherein iterations are performed until a convergence is determined.

11. The system of claim 7, wherein the measure of dependency is one of an estimation of mutual information among the plurality of images, correlation among the plurality of images and joint movements among the plurality of images.

12. The system of claim 7, wherein estimating the mutual information terms comprises determining a convolution of a probability of an updated pixel and a Gaussian density around the updated pixel.

13. A computer readable medium embodying instructions executed by a processor to perform method steps for multiple image restoration, the method steps comprising:
   receiving a plurality of images, wherein each image of the plurality of images includes a common signal with remaining ones of the plurality of images, and each image of the plurality of images is corrupted by independent noise different than noise of the remaining ones of the plurality of images;
   initializing a reduced noise estimate of the plurality of images;
   estimating a probability of a distribution of noise around each pixel and a probability of the common signal;
   estimating mutual information between noise on the plurality of images based on the probabilities of the distribution of noise around each pixel, the probability of the common signal and a joint distribution of the noise on the plurality of images; and
   updating each pixel within a search range to determine a restored image by reducing the mutual information between the noise on the plurality of images.

14. The method of claim 13, wherein initializing the reduced noise estimate of the plurality of images comprises applying a low-pass filter to an average of the plurality of images.

15. The method of claim 13, wherein estimating the distributions of noise and the joint distribution, estimating the mutual information and updating each pixel are performed iteratively, wherein updates of respective pixels correspond to a minimum of the mutual information within the search range.

16. The method of claim 15, wherein iterations are performed until a convergence is determined.

17. The method of claim 13, wherein the mutual information is included to determine independence between noise.

18. The method of claim 13, wherein estimating the mutual information terms comprises determining a convolution of a probability of an updated pixel and a Gaussian density around the updated pixel.

* * * * *